United States Patent [19]
Charny

[11] Patent Number: 5,978,357
[45] Date of Patent: Nov. 2, 1999

[54] PHANTOM FLOW CONTROL METHOD AND APPARATUS WITH IMPROVED STABILITY

[75] Inventor: Anna Charny, Sudbury, Mass.

[73] Assignee: Cabletron Systems, Inc., Rochester, N.H.

[21] Appl. No.: 08/826,235

[22] Filed: Mar. 27, 1997

[51] Int. Cl.$^6$ ............................ G01R 31/08; G06F 11/00; G08C 15/00
[52] U.S. Cl. ............................ 370/231; 370/200; 370/232
[58] Field of Search .................................. 370/395, 397, 370/230, 231, 235, 236, 468, 252, 253, 362, 364, 232

[56] References Cited

U.S. PATENT DOCUMENTS

5,748,901  5/1998  Afek et al. .............................. 370/235

Primary Examiner—Chi H. Pham
Assistant Examiner—Afsar Qureshi
Attorney, Agent, or Firm—Wolf, Greenfield & Sacks, P.C.

[57] ABSTRACT

A flow control method and apparatus for controlling flow through an output link in a communication network modifies a prior art Phantom flow control method by calculating the maximum allowable cell rate as a function of the number of active flows through the output link. To accomplish this, the method and apparatus calculates alpha smoothing parameters as a function of the number of virtual channels flowing through the output link. The method and apparatus improves the stability of the Phantom flow control method, and also enables it to be used with less costly network switches, such as shared memory switches.

16 Claims, 8 Drawing Sheets

PHANTOM FLOW CONTROL METHOD AND APPARATUS WITH IMPROVED STABILITY

FIELD OF THE INVENTION

This invention relates generally to asynchronous transfer mode (ATM) communication and data networks and, more particularly, to flow control in ATM communication networks.

BACKGROUND OF THE INVENTION

A network is generally defined as a collection of nodes interconnected by means of one or more communication links. End systems connected to the network both send data to, and receive data from, other end systems connected to the network. When an end system is a sender of data, it is referred to as a "source" for that data. When an end system is a receiver of data, it is referred to as a "destination" for that data. Typically, end systems act as both sources and destinations, depending on whether they are sending or receiving data. When acting as a source, an end system typically sends data in the form of messages over a communication link. Messages can flow between communication links and end systems within the network through bridges or routers. Multiple communication links generally are interconnected through a series of bridges and routers in a network.

Each message comprises a sequence of bits. Typically, messages sent over a network are divided into smaller blocks of information called "packets". The flow of packets in the network is usually referred to as "traffic." The packets are sent over the network in accordance with a data transfer protocol which specifies the form of the data as it is being transferred from switch to switch.

Asynchronous transfer mode (ATM) is one of the general classes of digital switching protocols that are used to relay and route traffic through a network. Unlike other known data transfer protocols, such as X.25 or frame relay, ATM transfers data by means of short, fixed length units of information called "cells." In applications utilizing ATM, data packets at a source are first broken up into such fixed length cells, transmitted through the network, and then reassembled at a destination. ATM cells are 53 bytes long consisting of a 5-byte header and a 48-byte information field. The header contains information used by the network to relay the cell from one node to the next over a pre-established route through the network. User data is contained in the remaining 48 bytes of the cell.

The ATM protocol uses a concept of "virtual networking" (also called "virtual channeling") to pass traffic between two end systems in a network. In accordance with this concept, ATM cells always traverse the same path from source to destination, but that path is not reserved for one end system. The path for a particular cell is only set up through the network as that cell is traversing the network. Any time a given end system is not actually occupying a link, another end system is free to use that link.

Accordingly, an ATM connection exists only as sets of routing tables stored in each network node, switch, or other intermediate system along the virtual channel. The routing tables are based on a virtual circuit identifier (VCI) and virtual path identifier (VPI) contained in the cell header. When a virtual channel is established, each node is provided with a set of look-up tables. By accessing the look-up tables, the node first identifies an incoming cell by header address, then routes it through the node to the proper output port.

The cell is thus passed from node to node over the preselected channel. Two cells that are ultimately bound for different destinations may be carried, one after the other, over the same physical medium (e.g., wire) for a common portion of their travel through the network.

With ATM, the successful transmission of packets from source to destination requires successful delivery of all the ATM cells formed from the original information packet. If any one cell is lost, the entire packet must be re-transmitted since the ATM network has no facilities for error correction. If cells are lost along the way, a sender must repeatedly resend the entire original information packet, resulting in an increasing load on the network, thereby creating more network congestion and more cell loss. As a result, ATM networks can operate efficiently only when there is minimal cell loss.

One way to avoid cell loss is to design each communication link and switch to handle the peak load expected through the network. This principle is the basis for Constant Bit Rate service (CBR) in ATM. This results in highly inefficient use of network resources, however, during the non-peak times. To ensure more efficient utilization, the ATM Forum has defined Available Bit Rate service (ABR), which is designed to maximize the utilization (e.g., bandwidth) of network resources while sharing the resources in a "fair" way among network users. The ABR Service is typically used for data traffic.

In order to fairly share network resources between users, a flow control mechanism is used to control the flow of traffic through the network. A common method of flow control (called "rate based" flow control) informs each data source of the maximum data rate at which it can transmit. Rate based flow control in ATM, as defined by the ATM Forum, requires that each data source periodically transmit a resource management (RM) cell. The RM cell loops over the virtual circuit and eventually returns to the data source. As the RM cell flows away from the source, it carries a value called the current cell rate of the data transfer session which informs the switches along the virtual circuit of the allowed cell rate of the session. Each switch along the route can modify another field in the RM cell called the "explicit rate" (ER), reducing it if congestion develops in that switch. When the RM cell returns to the source, the ER value is the maximum rate at which the source may transmit.

Rate based flow control is designed to provide "fairness" in sharing network resources. Specifically, the network bandwidth must be fairly shared among different users of the network. A widely accepted measure of fairness is called "max-min fairness." A bandwidth allocation by definition is max-min fair if, for every session, one session cannot increase its bandwidth without decreasing the bandwidth of sessions of equal or lower bandwidth.

One known method of implementing max-min fairness, known as "Phantom flow control" (Phantom), is a variant of rate based flow control. The Phantom method is an attempt at bounding the rate of each session (i.e., virtual channel) that share a link by the amount of unused bandwidth on that link. Accordingly, each link includes an additional imaginary session, referred to as the "Phantom" session. The Phantom method is described completely in an article (incorporated herein in its entirety, by reference) written by Afek et al., entitled "Phantom, A Simple and Effective Flow Control Scheme," Proc. SIGCOMM '96, Palo Alto, Calif., August 1996.

The Phantom method disclosed in the Afek article is used for rate based flow control of ATM cells passing through an output-buffered ATM switch. The Phantom method measures free bandwidth available on a link over a given time interval and computes a smoothed average by applying an exponential filter to the measured free bandwidth value to produce a value called the "Maximum Allowed Cell Rate" (MACR). The MACR is used to adjust the ER parameter in the RM cells, thereby controlling the maximum source cell rates. A number of variables are required to determine the MACR. In particular, MACR is a function of weighting parameters (alpha values) which are a function of the total number of cells in the output buffer queues ("queue length") relative to a threshold queue value ("queue-threshold"). Alpha values also vary depending on whether the MACR is increasing or decreasing.

Figure 1:
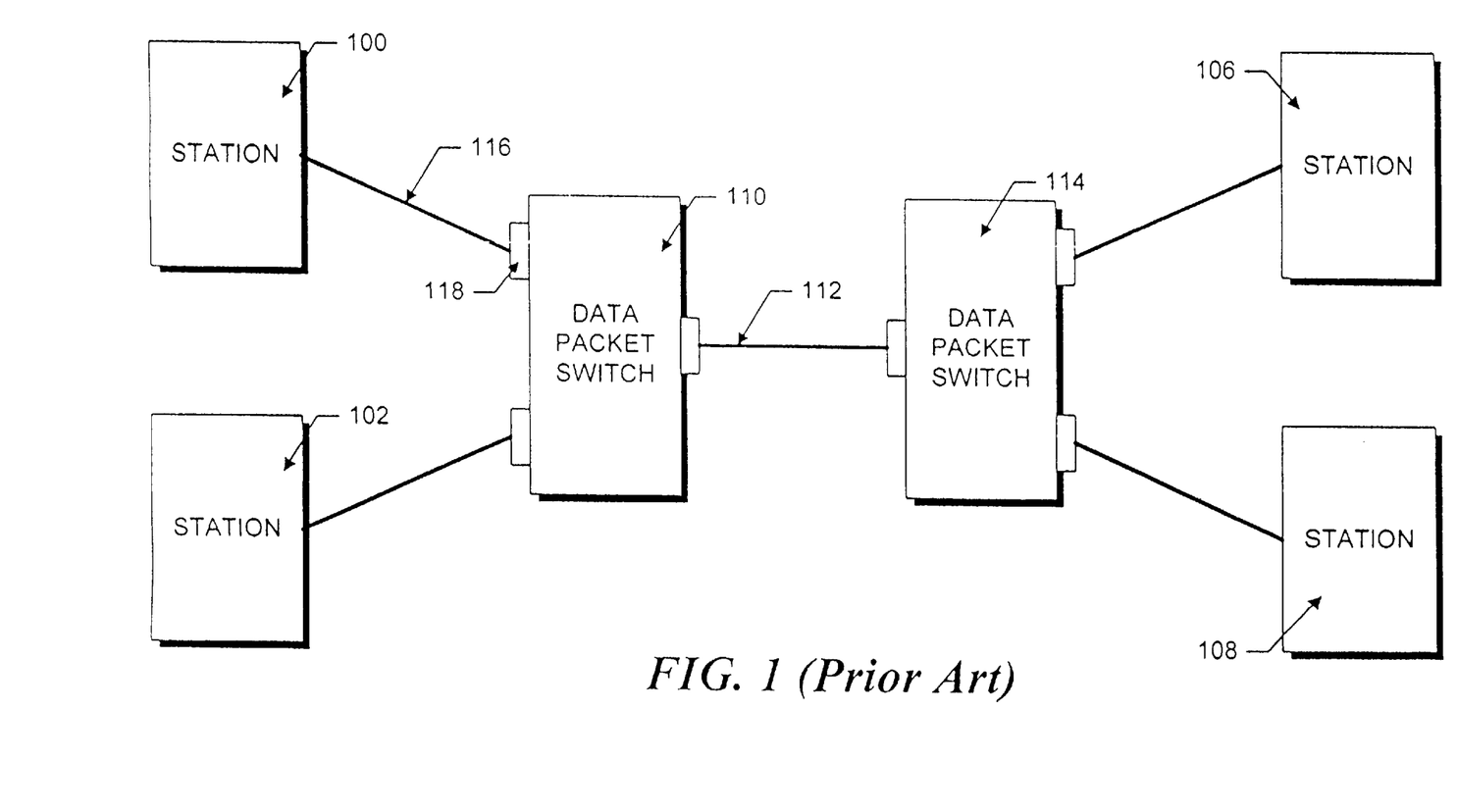
FIG. 1 is block schematic diagram of a data packet switching network on which the inventive method and apparatus may be implemented.

FIG. 1 illustrates, in very generalized form, a data packet local area network involving four stations 100, 102, 106, and 108 (hereinafter 100–108), respectively, in which the Phantom flow control method can be utilized. In such a network, each station 100–108 contains software which breaks the packets up into ATM cells and affixes an appropriate header indicating how each cell should be routed through the network. Each station also contains software which receives ATM cells and reassembles the cells into the completed data stream.

Stations 100 and 102 are connected to an ATM switch 110 and stations 106 and 108 are connected to another ATM switch 114. Switches 110 and 114 route cells between the stations 100–108 and control access to the network. For example, station 100 may send cells over media line 116 to media input port 118 of switch 110. Switch 110 may route data cells to a destination station, for example station 106, based on the information in each cell header. To do this, cells are first switched by switch 110 onto output line 112 to switch 114. Switch 114 then routes the cells to station 106. Although only one output line 112 is shown, switch 110 may have several output lines.

Each switch, for example switch 100, acts as a cell relay. Cells that arrive from one of the incoming communication links are examined by the switching process which determines (from the routing codes in the cell header) which output line should be used. The cell is then added to a FIFO buffer queue for that output line which holds cells waiting to be transmitted on the associated outgoing communication link 112.

The Phantom method of computing and stamping the ER value of the RM cell for such a network is shown below.

Every interval of length tau:

choose AINC and ADEC according to Table 1 (below) in view of the following parameters and equations:
D=unused link capacity of output link of output buffered switch
UTILIZATION_FACTOR=the weight of the regular virtual channel vs. the Phantom virtual channel
DECREASE_FACTOR=value used for limiting the speed of the decrease in MACR
if(D>$MACR^{old}$): $MACR^{new}$=$MACR^{old}$ (1−AINC)+ D*AINC
else $MACR^{new}$=max ($MACR^{old}$ (1−ADEC)+ D*ADEC, $MACR^{old}$*DECREASE_FACTOR)

For every Backward RM cell:

ER=min (ER, UTILIZATION_FACTOR*$MACR^{new}$)

TABLE 1

Computation Of The Smoothing Parameters

| queue | AINC | ADEC |
|---|---|---|
| queue < Q_THRESH | alpha | alpha/16 |
| Q_THRESH < = queue < 2 Q_THRESH | alpha/2 | alpha/8 |
| 2 Q_THRESH < = queue < 4 Q_THRESH | alpha/4 | alpha/4 |
| 4 Q_THRESH < = queue < 8 Q_THRESH | alpha/8 | alpha/2 |
| 8 Q_THRESH < = queue < 16 Q_THRESH | alpha/16 | alpha |
| 16 Q_THRESH <= queue | alpha/32 | 2 alpha |

One advantage of the Phantom method is that its implementation is relatively inexpensive. However, since the Phantom method was designed for an output-buffered switch, it cannot be applied in a straightforward manner to other architectures such as, is for example, shared memory switches with per-input port memory limits. This alternative architecture generally is less expensive to manufacture than output buffered switches. Accordingly, it would be desirable for the Phantom method to be applicable to these less expensive switch architectures.

Another problem with the Phantom method is that it can cause significant oscillations and instability in the cell rates under certain conditions. Accordingly, it would be desirable to have an apparatus and method that improves the stability of the Phantom flow control method. It is among the general objects of the invention to provide such an apparatus and method.

SUMMARY OF THE INVENTION

In accordance with one aspect of the invention, the Phantom flow control method is modified to improve performance by reducing instability and oscillations. In addition, the Phantom method is modified to enable use in a shared memory switch with per-input buffer allocation. To that end, the computation of MACR has been modified by first offsetting the queue threshold value by a small number of cells per virtual channel. This modification prevents the initiation of oscillations possible in the Phantom method in the case of synchronized arrival of cells from a large number of flows. In the next step of calculating MACR, the alpha smoothing parameters used in the computation of MACR are chosen as a function of a number of active virtual channels. More specifically, these parameters are chosen to be inversely proportional to one more than the number of active virtual channels (a/k/a "flows"). This modification significantly improves stability of the algorithm in the presence of a large number of flows. Finally, the value of MACR is chosen to be above a preselected minimum threshold value. The threshold value is chosen to be the minimum of a certain fraction of the equal per-flow share of the available bandwidth and an absolute lower bound on the value of MACR. The purpose of this modification is to prevent oscillations from occurring when the value of MACR becomes too low in response to a transient overload.

The primary purpose for each of the three modifications to the computation of MACR is to reduce severe oscillations that can cause instability with the Phantom method. Although such instability can occur for any switch architecture in which the Phantom method is used, it can be especially severe on a shared memory switch with per-input port buffer allocation since the Phantom method was designed for output buffered switches.

Accordingly, it is among the objects of the invention to provide an apparatus and method that enables the Phantom flow control method to be used on less expensive ATM switches.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

In accordance with the invention, the Phantom flow control method is modified to improve its performance and to allow its use with less expensive ATM switches such as shared memory switches.

Figure 2:
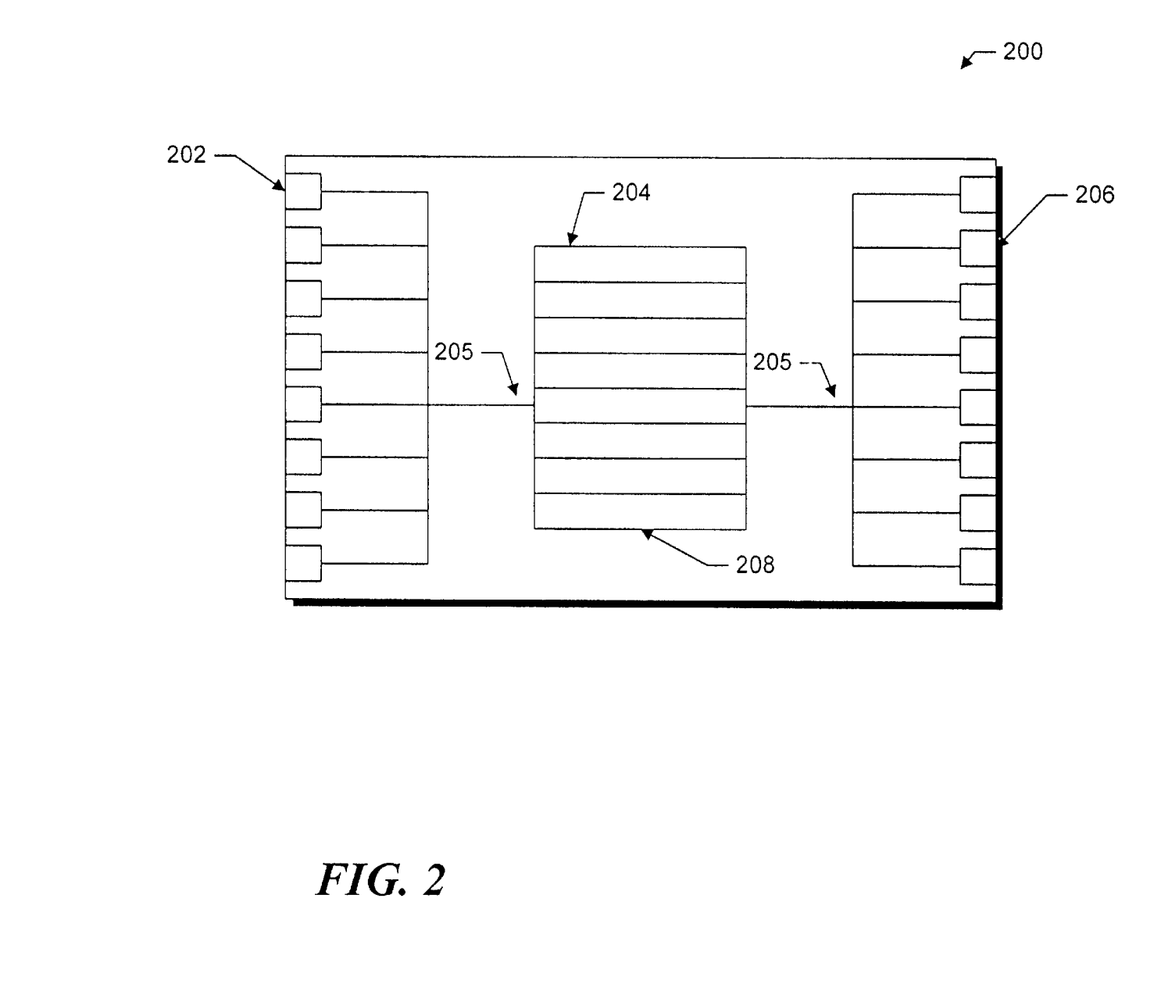
FIG. 2 is a schematic illustration of a shared memory ATM switch that may be used with the invention.

FIG. 2 shows an exemplary shared memory switch 200 having eight input ports 202, a shared memory 204, a bus 205 and eight output links 206. There are many possible implementations of a shared memory switch. Typically, when a cell is received at an input port 202, it is forwarded by means of the bus 205 to the shared memory 208, where it is queued until it becomes possible to forward this cell to the corresponding output port. Typically, each flow is allocated a separate queue 208 in the shared memory 208. A scheduling mechanism then determines the service order of the queues in the shared memory 208.

Figure 3:
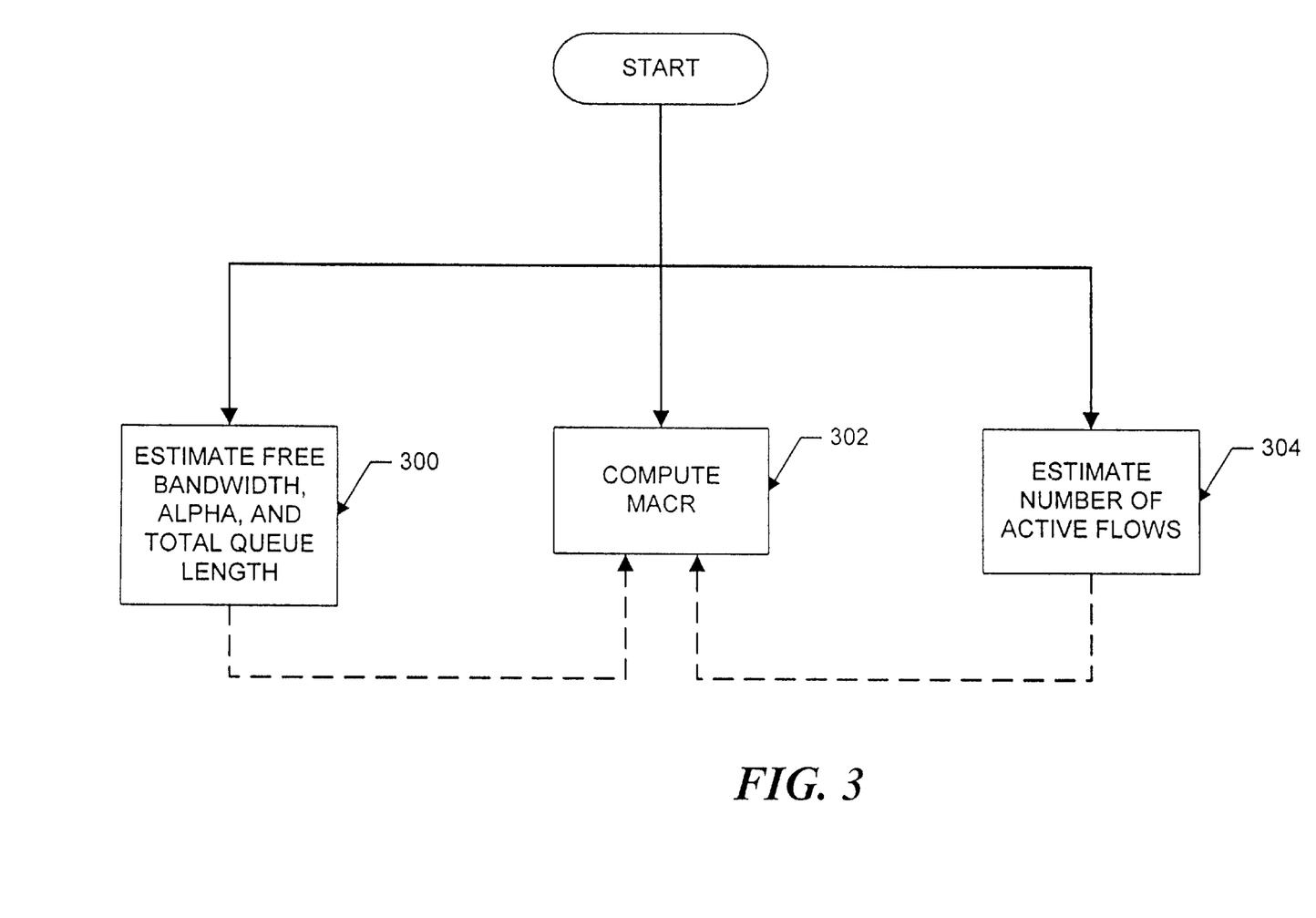
FIG. 3 is a flow chart describing the improved Phantom flow control method.

The computation of the allocation of MACR in the switch shown in FIG. 2 is performed for each output port 206 and for the bus 205. FIG. 3 describes the processes for computing MACR. The computation of MACR (process 302) is performed periodically. Process 302 requires knowledge of the amount of free bandwidth (a/k/a unused link capacity) for an output port (denoted "D") and the total number of cells queued (denoted "Q_TOTAL"). The determination of these values is performed by process 300. In addition, process 302 requires knowledge of the number of active flows (a/k/a virtual channels) sharing an output port (denoted "NUM_ACTIVE"), which is estimated by process 304. In general, processes 300, 302 and 304 can operate in parallel. No synchronization is required between these processes. However, process 302 is assumed to have access to the current estimates of the free bandwidth D, total queue length, Q_TOTAL, and the number of active connections (NUM_ACTIVE) computed by processes 300 and 304. This is symbolically shown by dotted lines in FIG. 3.

Figure 4:
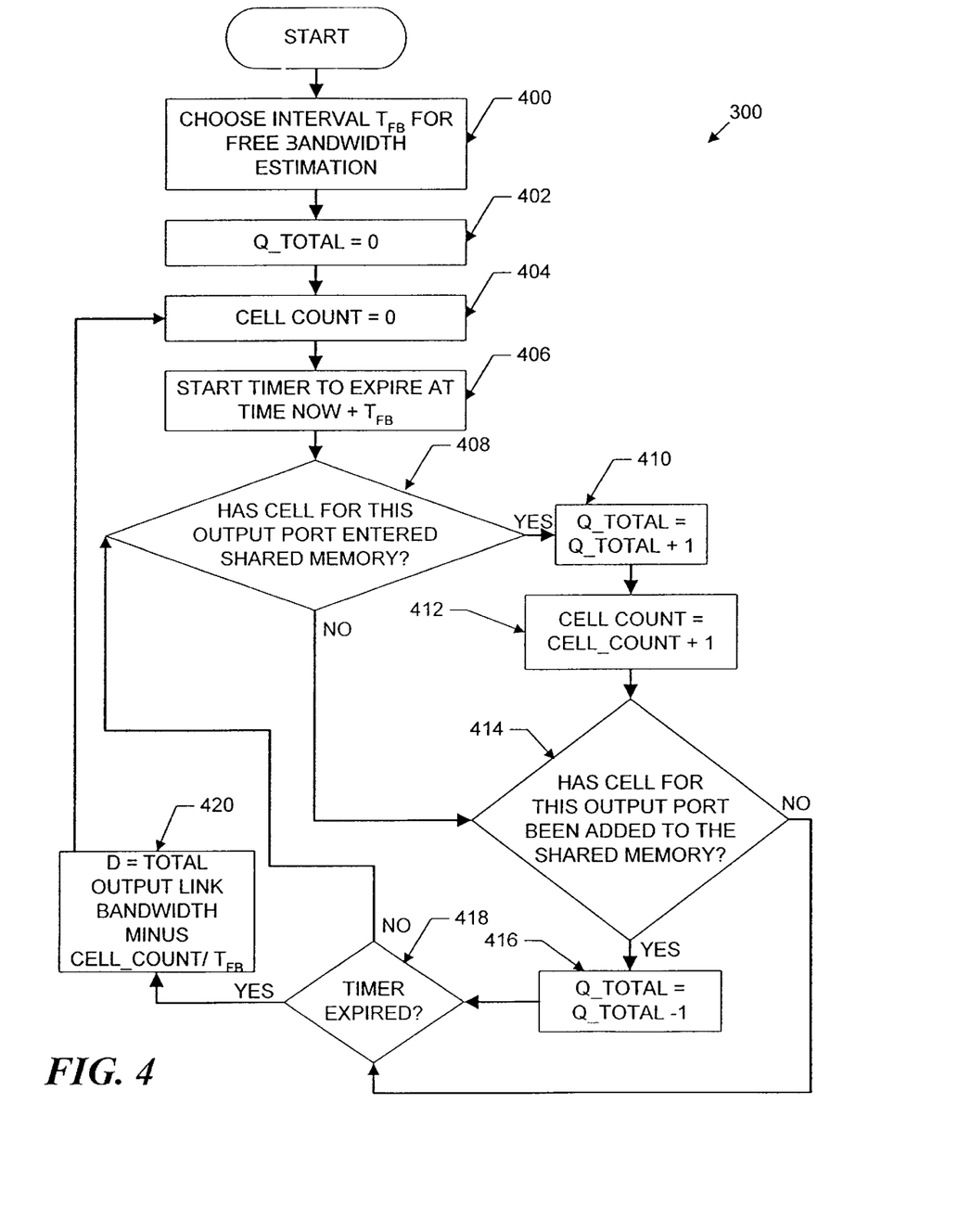
FIG. 4 is a flow chart showing an exemplary embodiment of estimating free bandwidth, alpha, and the total of Q_LENGTH.

There are many ways of determining the free bandwidth of an output link and the total number of cells queued for each output port in the shared memory. An exemplary embodiment of process 300 is shown in FIG. 4. The computation of FIG. 4 is performed for each output port 206, and for the bus 205. At the initialization time, a time interval (Tfb) is chosen (step 400). The process 300 computes the number of cells received in time intervals of length Tfb. It does this by initializing the CELL_COUNT variable to zero in block 404. The CELL_COUNT variable is incremented any time a cell destined to the output has been added to the shared memory 204 in blocks 408 and 412. When the timer expires (in block 418), the free bandwidth d is computed in block 420 by subtracting the ration CELL_COUNT/Tfb from the total bandwidth of the output link corresponding to the output port 206. After the new estimate of the variable d has been computed, CELL_COUNT is reset to zero in block 404, the timer is reset in block 406 and the process repeats to obtain the new estimate of D. In addition to estimating the value of D, the process 300 maintains the total number of cells in all queues in the shared memory Q_TOTAL corresponding to a given output port. At initialization, Q_TOTAL is set to zero in block 402. Any time a cell destined to this output port is added to the shared memory, Q_TOTAL is decremented by 1 (blocks 414,416). The values D and Q_total computed inside block 300 of FIG. 3 are available at all times for the computation of block 302 in FIG. 3.

Figure 5:
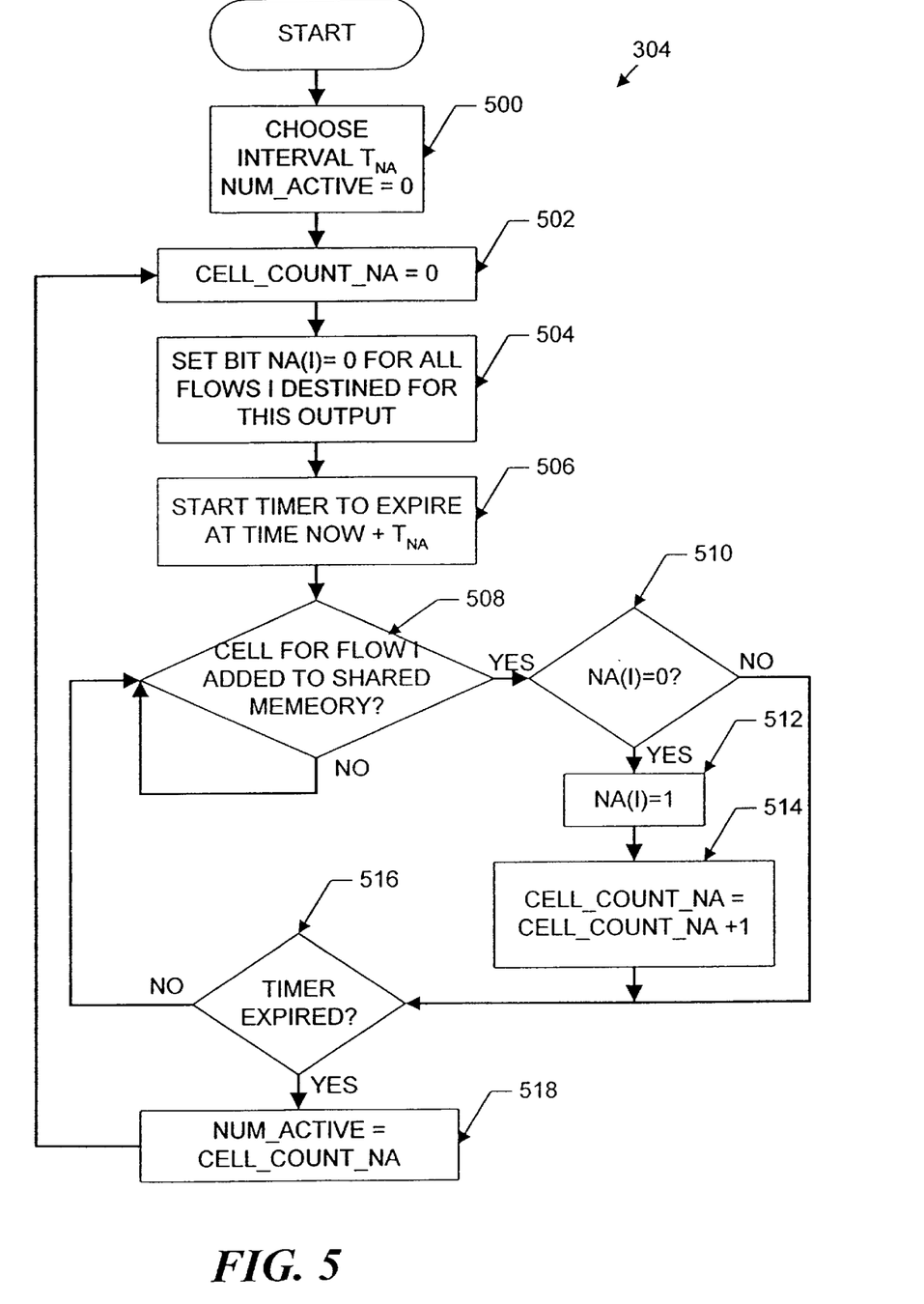
FIG. 5 is a flow chart of an exemplary process for estimating a number of active flows.

FIG. 5 shows an exemplary embodiment of process 304 of FIG. 3. This is just one of many embodiments for estimation of the number of active flows (i.e. virtual channels). This embodiment assumes that a bit "NA(I)" be maintained for each flow "I". At initialization (block 500) an interval Tna for estimating the number of active flows (NUM_ACTIVE) is chosen, and NUM_ACTIVE is set to zero. In block 502 the variable CELL_COUNT_NA is initialized to zero, and in block 504 all bits NA(I) are set to zero as well. The timer is started in block 506. When a cell of flow I is added to the shared memory for the first time after the timer has been started, the process sets NA(I)=1 for this flow (block 512), and increments the variable CELL_COUNT_NA by one in block 514. For subsequent arrivals of the cells of flow I in the current estimation interval Tna the check in block 510 fails, and the variable CELL_COUNT_NA is not incremented. This ensures that each flow is counted only once during each estimation interval. At the expiration of the timer in block 516 the current value of CELL_COUNT_NA is saved in the variable NUM_ACTIVE (BLOCK 518_, after which the CELL_COUNT and all BITS NA(I) are reset in blocks 502, 504, and the new estimation interval starts in block 506. The value NUM_ACTIVE computed inside block 304 of FIG. 3 is available at all times for the computation of block 302 in FIG. 3.

Figure 6:
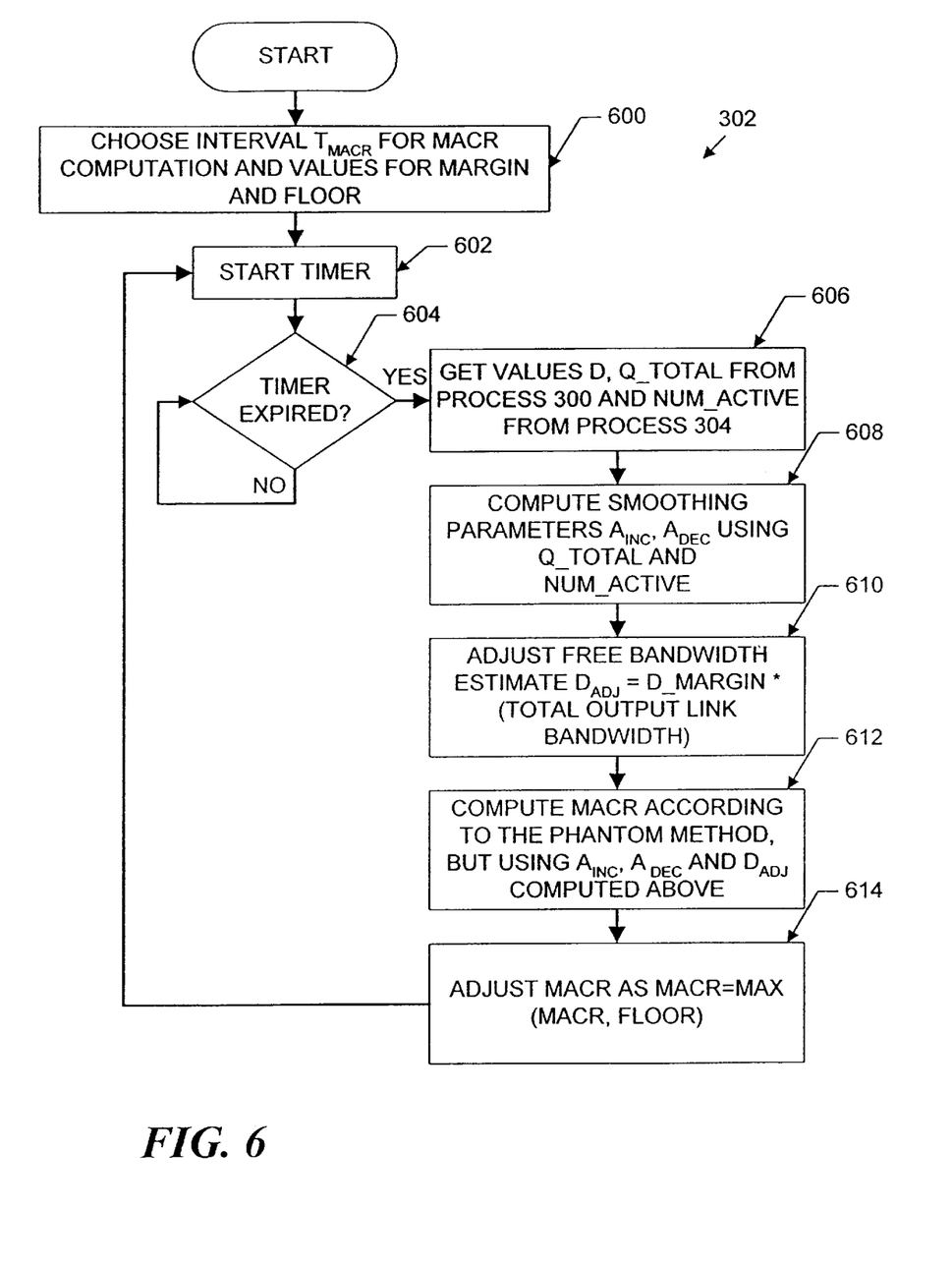
FIG. 6 is a flow chart of an exemplary embodiment of the process of computing MACR.
Figure 7:
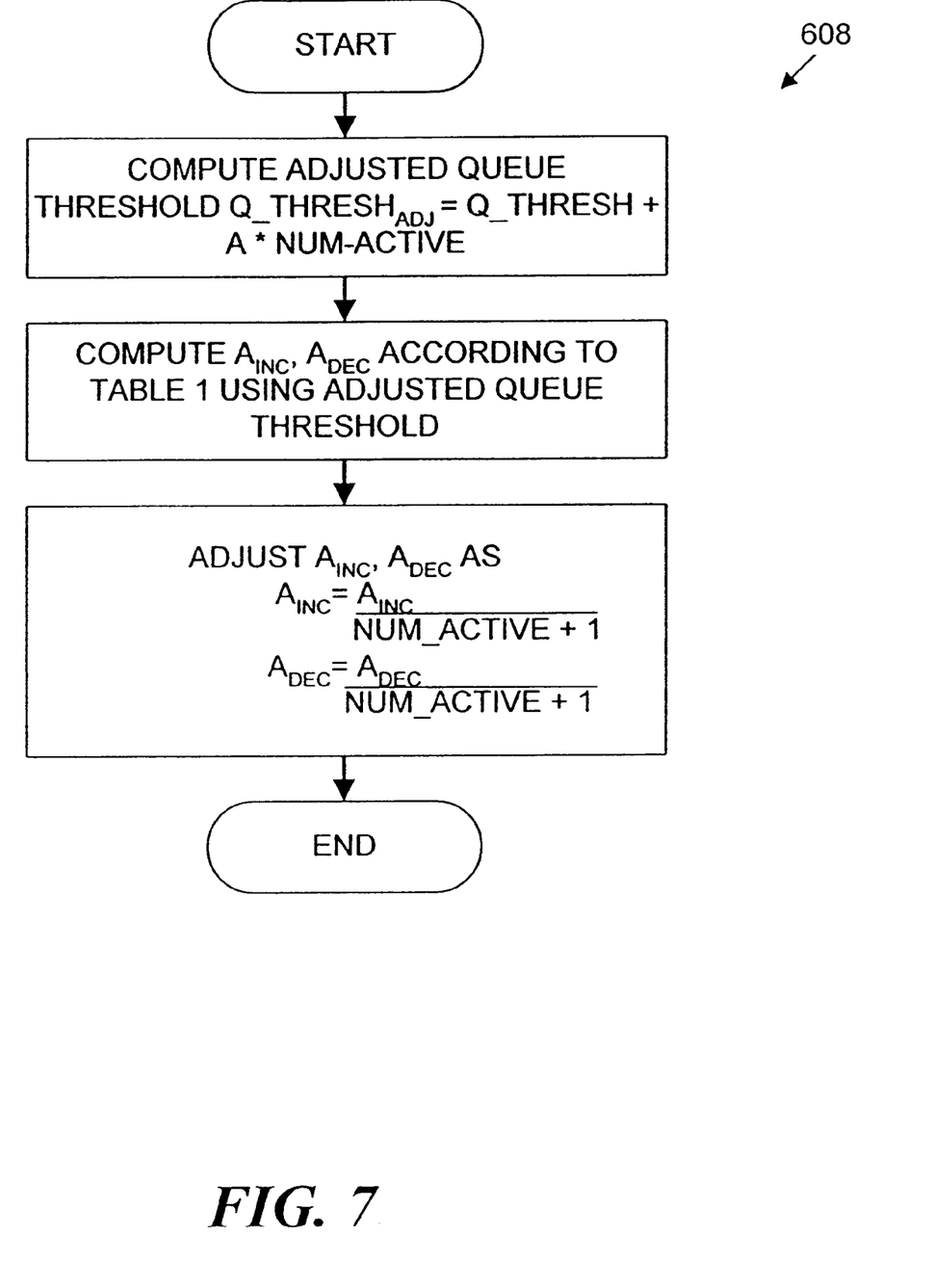
FIG. 7 is a flow chart of a process for computing the smoothing parameters AINC and ADEC using Q_TOTAL and NUM_ACTIVE.
Figure 8:
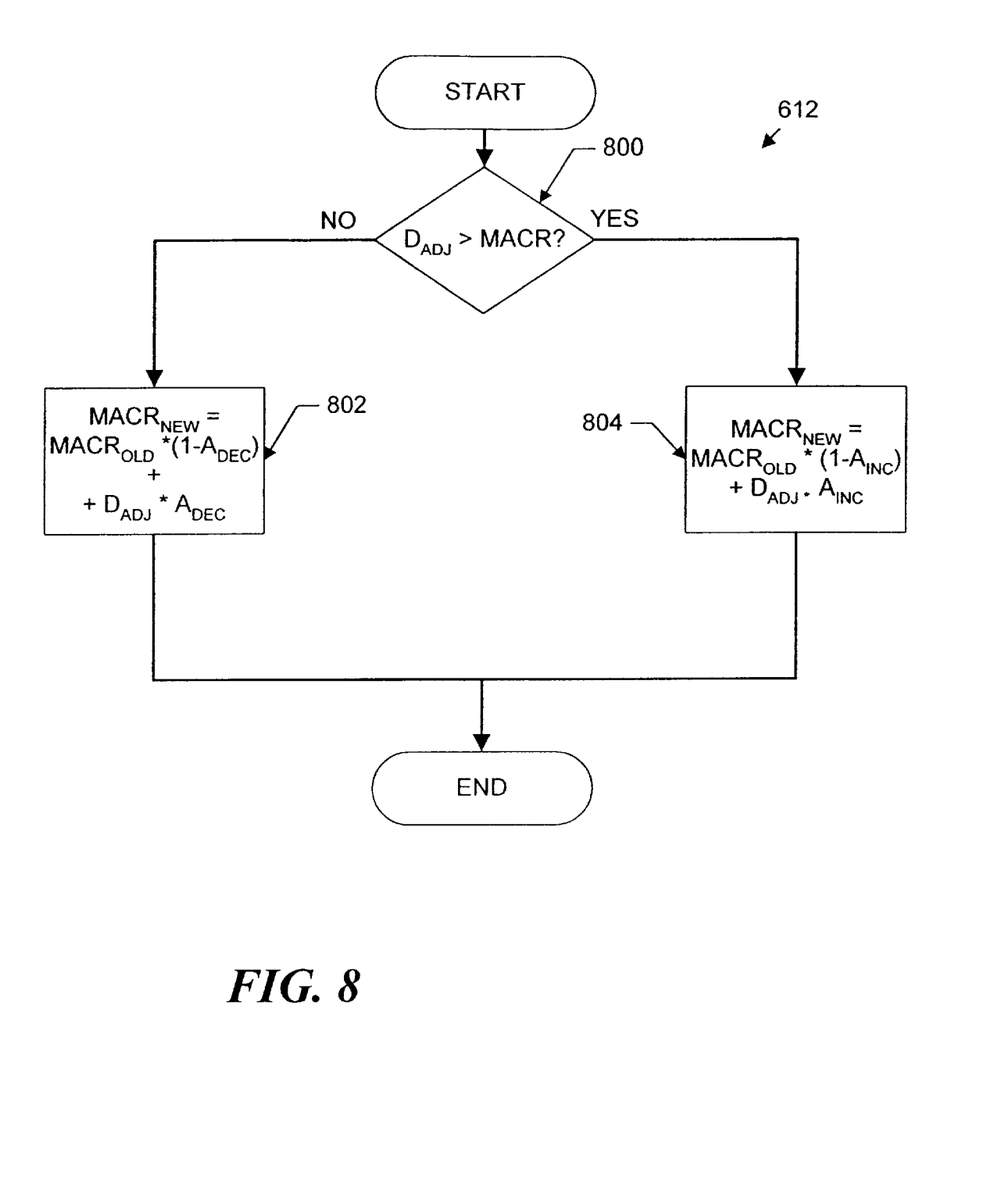
FIG. 8 is a block diagram of a process for computing MACR using the modified alpha values.

FIG. 6 shows an exemplary embodiment of process 302 of FIG. 3. In block 600 the interval for MACR computation is chosen, and the variables margin and floor are initialized. The timer is started in block 602. The computation of MACR in blocks 606–614 is performed upon the expiration of the timer, and the timer is restarted again. In block 606 the values of the necessary variables computed independently by processes 300 and 304 are obtained. In block 608, the values of the smoothing parameters AINC and ADEC (the alpha values) are computed using the values Q_TOTAL and NUM_ACTIVE from block 606. The details of process 608 are shown in FIG. 7. In block 610 the estimate of the free bandwidth (D) is adjusted by subtracting (i.e. reserving) a fixed ratio of the total bandwidth of the output link (margin) from the estimate of free bandwidth obtained in block 606. Typically the value of margin is chosen to be 0.1, which corresponds to the target reservation of at least 10% of the total bandwidth for queue draining. This adjustment is necessary to provide sufficient free bandwidth on the link for draining transient queues and thus, is an improvement of the Phantom method by limiting extremely slow queue draining, buffer overflow and cell loss commonly produced by Phantom. In block 612, MACR is computed using the equations of the Phantom method, except the values of AINC, ADEC are chosen in blocks 606–608 differently from the Phantom method, and the adjusted free bandwidth DADJ computed in block 608 is used instead of the variable D. FIG. 8 shows the details of block 610. The value of MACR is further adjusted in block 614 to disallow the value of MACR to fall below a certain value given by variable floor. Typically it is chosen to be at least as large as a certain fraction of total output link bandwidth divided by the maximum number of flows supported by the output port. The purpose of the adjustment of MACR in block 614 is to prevent very low MACR values which may result from transient overload. Since the rate-based flow control standardized for the ABR service in the ATM networks requires that the rate of sending RM cells be proportional to the flow's rate, very low MACR values result in very low flow rates for long periods of time. In turn, this results in the increase of the switch allocation, triggering the onset of severe oscillations.

FIG. 7 describes the details of block 608 of FIG. 6. In block 700 the value of the queue threshold, used by the Phantom method for determination of the alpha values in Table 1, is adjusted by adding a small number of cells ("A") per each active flow to this threshold. The value of the parameter "A" is typically chosen to be one or two. This adjustment is necessary because the value of the threshold is used to determine the degree of congestion. Essentially, the degree of congestion is quantified by the ratio of the threshold and the actual number of cells queued for the output. If the number of active connections is large, arrival of one cell per flow in a short interval of time (which can happen frequently due to synchronization frequently occurring in real networks), may result in the number of cells queued to be significantly larger than the fixed threshold value of the Phantom method. This may trigger the method to behave as if the link were severely congested even if in reality each flow is transmitting data at its correct fair share, onsetting potentially severe oscillations and instability. In block 702, the alpha values AINC and ADEC are computed according to Table 1, except the adjusted queue threshold is used instead of the fixed threshold.

In block 704 the values of AINC and ADEC are further adjusted by dividing the values obtained in block 702 by the number of active connections plus one. This adjustment is needed for the following reason. The smoothing parameters AINC and ADEC in the Phantom scheme defines the amount that the value of MACR is allowed to change in a single computation. A single change in the value of MACR for some port results in the change of the rates of all flows bottlenecked at the link corresponding to that port. If the number of flows is large, even a small increase in the value of MACR may result in a very large cumulative change of the input rate of all flows. In turn, this may cause a large transient queue growth, and the resulting drop in MACR. This frequently results in severe oscillations and instability of the Phantom method. This invention addresses this problem by making the values of the smoothing parameters inversely proportional to the number of active flows. As a result, the magnitude of the cumulative rate changes due to a single change in MACR is no longer proportional to the number of flows sharing the bottleneck link.

FIG. 8 shows the details of block 612 for calculating MACR with the modified alpha values. As mentioned earlier, the computation of MACR described in this figure is the same as in the Phantom method, except the values of parameters AINC and ADEC are chosen in accordance with this invention, and the adjusted value DADJ is used instead of the value D used in the Phantom method.

The bus 205 in a shared memory switch may be an additional bottleneck. To account for this bottleneck, the same improved flow control methods as described in FIGS. 3–8 may be utilized in accordance with the invention. Specifically, the improved method considers the bus 205 to be an output link shared by all flows traversing the switch and calculates an MACR value for the bus 205. When a backward RM cell is changed, the ER field is reduced to be the smaller of the MACR for the bus 205 and the MACR for the output link.

Although various exemplary embodiments of the invention have been disclosed, it will be apparent to those skill in the art that various changes and modifications can be made which will achieve some of the advantages of the invention without departing from the spirit and scope of the invention. These and other obvious modifications are intended to be covered by the appended claims.

Having thus described the invention, what we desire to claim and secure by Letters Patent is:

1. A method of determining a maximum allowed cell rate (MACR) for an bus of an ATM switch in a Phantom flow control method, the bus having a threshold queue value, a previous MACR value, and a bus bandwidth, the method comprising the steps of:

A. ascertaining the unused capacity of the bus bandwidth;

B. comparing the unused capacity to the previous MACR value;

C. estimating the number of virtual channels flowing into the bus over a selected time interval to produce a channel count; and D. calculating, based on the channel count and the comparison in step B, the MACR.

2. The method of determining the MACR as defined by claim 1 wherein the step D of calculating comprises the steps of:

D1. ascertaining an alpha value, the alpha value being a dependent upon the channel count.

3. The method of determining the MACR as defined by claim 2 wherein the step D1 of ascertaining comprises the steps of:

D1a. adding the channel count to the threshold queue value to produce a modified threshold queue value;

D1b. estimating the number of cells flowing into the bus over the selected time interval to produce a cell count; and D1c. comparing the cell count to the modified threshold queue value.

4. The method of determining the MACR as defined by claim 1 further comprising the steps of:

E. calculating a modified alpha value, the modified alpha value being inversely proportional to the channel count.

5. The method of determining the MACR as defined by claim 4 wherein the step E of calculating comprises the steps of:

E1. incrementing the channel count by one to produce a modified channel count;

E2. calculating an alpha value; and

E2. dividing the alpha value by the modified channel count to produce the modified alpha value.

6. The method of determining the MACR as defined by claim 1 comprising the further steps of:

F. calculating a floor MACR; and

G. preventing the MACR from having a value less than the floor MACR.

7. The method of determining the MACR as defined by claim 6 wherein the step F of calculating comprises the steps of:

F1. dividing a fraction of total output bus bandwidth by the maximum number of virtual channels supported by the output bus.

8. An apparatus for determining a maximum allowed cell rate (MACR) for an output link of an ATM switch in a Phantom flow control apparatus, the output link having a threshold queue value, a previous MACR value, and a link bandwidth, the apparatus comprising:

means for ascertaining the unused link capacity of the link bandwidth;

means for comparing the unused link capacity to the previous MACR value;

means for estimating the number of virtual channels flowing into the output link over a selected time interval to produce a channel count; and means for calculating, based on the channel count and the comparing means, the MACR.

9. The apparatus for determining the MACR as defined by claim 8 wherein the calculating means comprises:

means for ascertaining an alpha value, the alpha value being a dependent upon the channel count.

10. The apparatus for determining the MACR as defined by claim 9 wherein the means for ascertaining an alpha value comprises:

an adder for adding the channel count to the threshold queue value to produce a modified threshold queue value;

means for estimating the number of cells flowing into the output link over the selected time interval to produce a cell count; and means for comparing the cell count to the modified threshold queue value.

11. The apparatus for determining the MACR as defined by claim 8 further comprising:

means for calculating a modified alpha value, the modified alpha value being inversely proportional to the channel count.

12. The apparatus for determining the MACR as defined by claim 11 wherein the means for calculating a modified alpha value comprises:

means for incrementing the channel count by one to produce a modified channel count;

means for calculating an alpha value; and a divider for dividing the alpha value by the modified channel count to produce the modified alpha value.

13. The apparatus for determining the MACR as defined by claim 8 further comprising:

means for calculating a floor MACR; and means for preventing the MACR from having a value less than the floor MACR.

14. The apparatus for determining the MACR as defined by claim 13 wherein the means for calculating a floor MACR comprises:

a divider for dividing a fraction of total output link bandwidth by the maximum number of virtual channels supported by the output link.

15. A method of controlling cell flow through an output link of an ATM switch in a Phantom flow control method, the output link having a link bandwidth and a previous maximum allowed cell rate (MACR) value, the method comprising the steps of:

ascertaining the total bandwidth associated with the output link;

reserving a portion of the total bandwidth associated with the output link;

subtracting the reserved portion of total bandwidth from the total bandwidth associated with the output link to produce an adjusted free bandwidth;

ascertaining the unused link capacity of the link bandwidth;

comparing the unused link capacity to the previous MACR value;

calculating, based on the comparison of the unused link capacity to the previous MACR value, the MACR;

calculating a floor MACR; and selecting the minimum of the floor MACR and the MACR, wherein cell flow through the output link is no less than the minimum.

16. The method of controlling cell flow as defined by claim 15 wherein said calculating a floor MACR comprises the step of:

dividing a fraction of total output link bandwidth by the maximum number of virtual channels supported by the output link.

* * * * *

Disclaimer

5,978,357 - Anna Charny, Sudbury, Mass. PHANTOM FLOW CONTROL METHOD AND APPARATUS WITH IMPROVED STABILITY. Patent dated Nov. 2, 1999. Disclaimer filed June 28, 1999, by the assignee, Cabletron Systems, Inc.

The term of this patent shall not extend beyond the expiration date of Pat. No. 5,956,322.
*(Official Gazette,* December 28, 1999)